United States Patent [19]
Véron

[11] 3,979,959
[45] Sept. 14, 1976

[54] APPLIANCE FOR MEASURING PRESSURE

[75] Inventor: André Véron, Pau, France

[73] Assignee: Societe Nationale des Petroles d'Aquitaine, Paris, France

[22] Filed: June 6, 1975

[21] Appl. No.: 584,529

[30] Foreign Application Priority Data
June 19, 1974 France .............................. 74.21212

[52] U.S. Cl. ............................... 73/419; 73/398 AR
[51] Int. Cl.² ........................ G01L 7/16; G01L 9/04
[58] Field of Search ............ 73/398 AR, 419, 141 A

[56] References Cited
UNITED STATES PATENTS

| | | |
|---|---|---|
| 1,107,298 | 8/1914 | Haas ..................................... 73/419 |
| 2,597,724 | 5/1952 | Gratzmuller .......................... 73/419 |
| 2,986,939 | 6/1961 | Grandstaff ............................ 73/419 |

*Primary Examiner*—Donald O. Woodiel
*Attorney, Agent, or Firm*—Brisebois & Kruger

[57] ABSTRACT

This invention concerns an appliance for measuring pressures, particularly those above 5,000 bars.

This appliance comprises in combination, a manometric gauge and a dynamometric ring equipped with stress gauges, the section of the ring being such that its deflection does not exceed 0.13% of the elastic limit of the steel.

This appliance has the same characteristics as a manometric gauge, but its compactness, lightness and ease of handling mean that it can be used both in the laboratory and in industrial installations.

9 Claims, 7 Drawing Figures

APPLIANCE FOR MEASURING PRESSURE

This invention relates to an appliance for measuring pressures, particularly those above 5,000 bars.

In existing appliances, absolute measurement of pressure is obtained by measuring the force or weight M that has to be applied to a mobile surface S of known area, to keep it in balance with the hydrostatic thrust P, representing the pressure to be measured. At the point of equilibrium the hydrostatic thrust P is equal to M/S (P=M/S).

Such appliances are known as free-piston manometers or pressure gauges, or "dead-weight" pressure gauges, or manometric gauges.

The known pressure gauges can measure pressures of up to 15,000 bars with an average precision of $10^{-3}$, but they are heavy, cumbersome and expensive, and complicated. They are generally used as primary gauges to calibrate more manageable secondary gauges.

Manganin-wire gauges are the most commonly used secondary pressure gauges in the range of pressure covered by pressure gauges and beyond. The main feature of manganin-wire gauges is their linear response characteristic. However, temperature has a greater effect than pressure, and therefore has to be controlled carefully. Reproducibility of the response curve for these instruments can be obtained only through repeated checks.

Finally, there are various types of appliances for measuring pressure indirectly, using a mechanical component which undergoes deflection under pressure, with a mechanical or electromechanical deformation detector. Each model can be used within a pressure range for which the upper limit is directly related to the elastic limit of the component subjected to deformation. These appliances are convenient to use, and of excellent sensitivity and accurateness, but their precision is limited to a few per cent.

One object of the present invention is to provide an appliance which allows pressures to be measured with the precision and sensitivity of conventional pressure gauges, said appliance furthermore offering the main advantages of indirect measuring instruments, to wit : sensitivity and reliability, ease of handling and compactness.

To this end, the invention provides an appliance for measuring hydrostatic pressure, comprising a piston movable linearly and rotatively in the bore of a cylinder subjected to the said hydrostatic pressure, and which protrudes from the cylinder, and a passage connecting said cylinder bore to a pressure source, said piston resting, through the intermediary of thrust-means, on a first zone of a component made of an elastic material, while said cylinder rests on a second zone of said component, the latter being fitted with strain gauges, and said cylinder comprising means for keeping its inner diameter at a strictly constant value.

Said means of keeping the inner diameter of the cylinder at a strictly constant value may consist of a lining fitted into a cylinder barrel, and forming at least part of the cylinder inside which the piston moves, this cylinder barrel being connected with the pressure source by a passage.

In another embodiment, the means of keeping the inner diameter of the cylinder at a strictly constant value consist of a lining fitted into a cylinder barrel, and forming at least part of the cylinder within which the piston, made of the same material as the lining moves, this cylinder barrel being connected with the pressure source by a passage.

In a particular embodiment designed for the measurement of high pressures, said means of keeping the inner diameter of the cylinder at a strictly constant value consist of a metal carbide lining fitted into a cylinder barrel and forming at least part of the cylinder within which the piston, made of the same material as the lining, moves, this cylinder barrel being connected with the pressure source by a passage.

In one preferred embodiment, said component made of an elastic material consists of a ring, the arrangement being such that the common axis of said cylinder and said piston constitutes the axis of symmetry, and that two apices of said ring are defined by the intersection of this axis with said ring, the latter being fixed at one of said apices to the cylinder body, while the other apex constitutes the resting zone for the thrust means associated to said piston.

In this latter embodiment, the piston rests on the elastic component through the intermediary of thrust-means comprising a multiple-ball thrust-bearing associated with a single-ball joint.

In an advantageous embodiment, said ring is circular in cross-section.

The invention will be described herein-after with reference to the appended drawings which are given by way of illustration, but not of limitation of the scope of the invention.

FIG. 1 represents a free-piston pressure gauge wherein pistons and cylinders of increasingly reduced section have to be used, so as to prevent the appliance from being excessively heavy when used in high pressure ranges.

FIG. 2 represents a differential-piston pressure gauge, in which the size of the pistons can remain high even if the effective surface-area is small.

FIG. 3 is a diagram of a controlled-play pressure gauge, in which a counter-pressure is applied to the outer part of the cylinder to compensate for expansion caused by the internal pressure to be measured.

Figure 1:
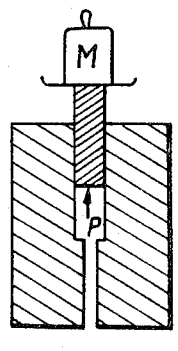
FIG. 1 shows a known free-piston pressure gauge.
Figure 2:
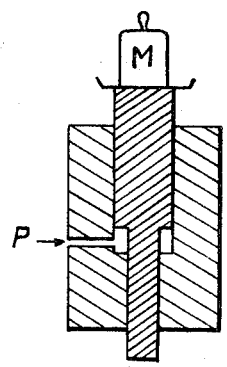
FIG. 2 shows a known differential-piston pressure gauge.
Figure 3:
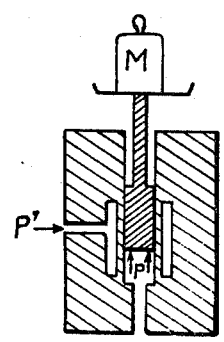
FIG. 3 shows a known controlled-play pressure gauge.
Figure 4:
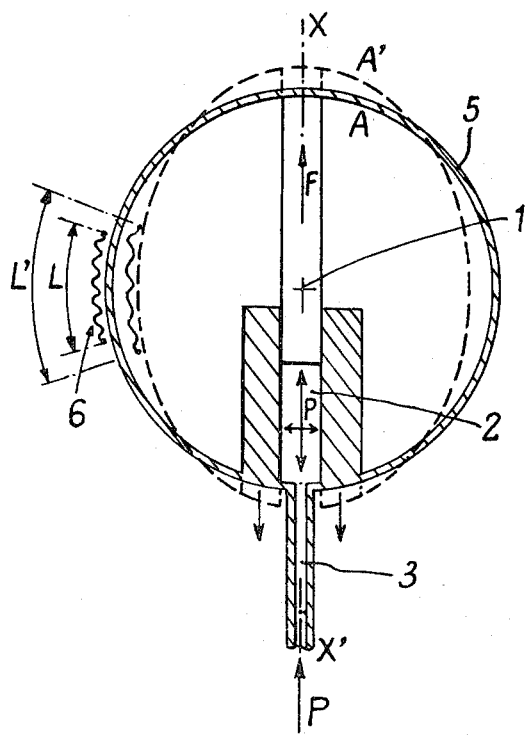
FIG. 4 shows a general diagram of a measuring appliance according to the instant invention.

FIG. 4 illustrates an appliance to measure hydrostatic pressure, showing a piston 1, which can move and rotate freely inside a cylinder 2, subject to the hydrostatic pressure to be measured, and protruding from this cylinder, and a passage 3 connecting the cylinder bore to a pressure source. The piston rests, by means of a thrust-block 4, on one point of a component 5 made of an elastic material, and the cylinder rests on another point of the same component; the said component is fitted with stress gauges, and the cylinder comprises means for keeping its inside diameter at a strictly constant value.

Figure 6:
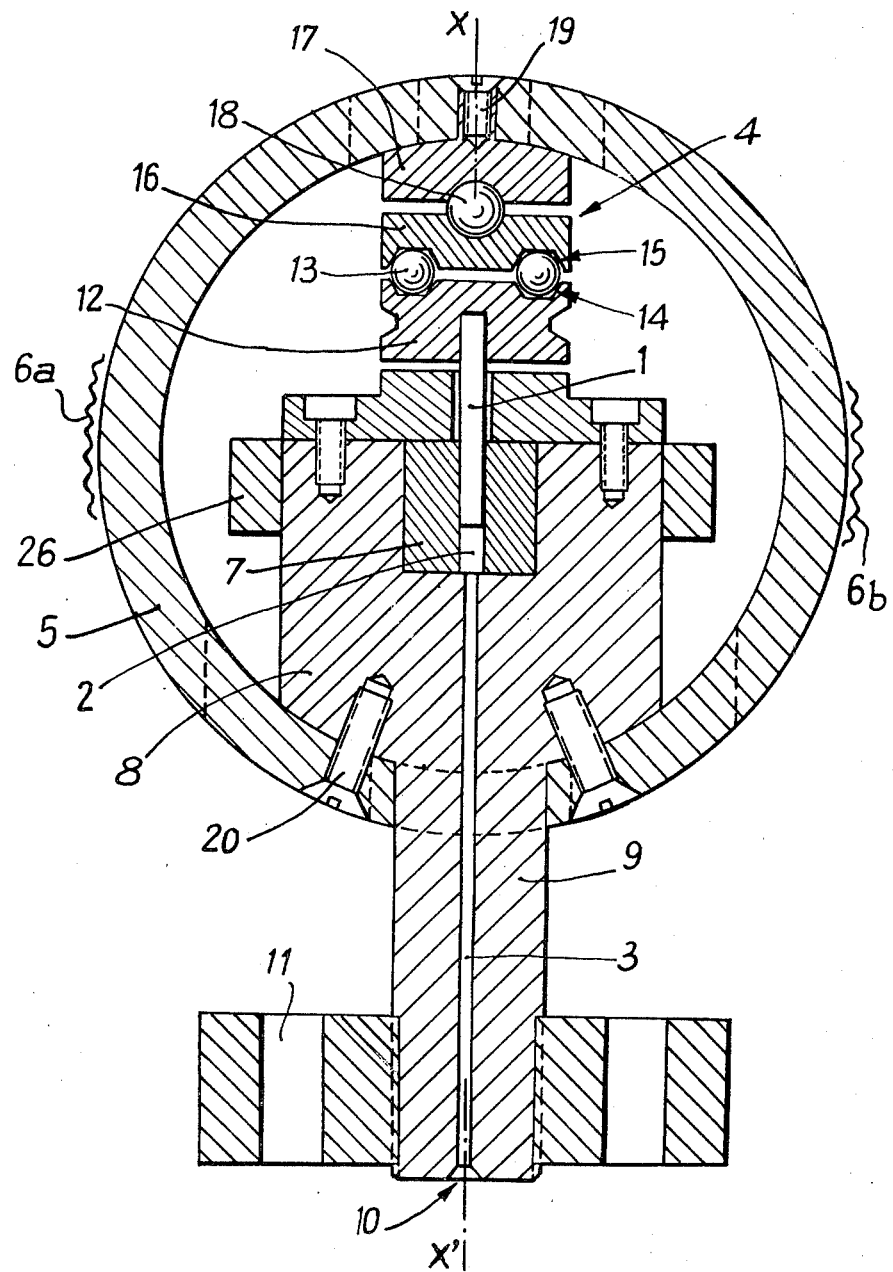
FIG. 6 is a cross-sectional view at right angles to the ring axis.

FIG. 6 representing a cross-sectional view of the appliance perpendicular to the ring axis, shows a piston 1, which can move and rotate freely inside a cylinder 2, consisting at least partly of a lining 7, made of a metal carbide such as tungsten carbide, fitted into a cylinder barrel 8, which is extended by an end-fitting 9 with the same axis XX' as the cylinder. The cylinder barrel and end-fitting contain an axial aperture forming the passage 3 connecting the cylinder with a component connected to a pressure source (not shown here).

One possible form of connection consists of interposing a lens-shaped annular seal, not shown here, held in a seat 10 in the perimeter of the opening of the passage 3, and held against the pressure source by means of a flange 11.

Figure 5:
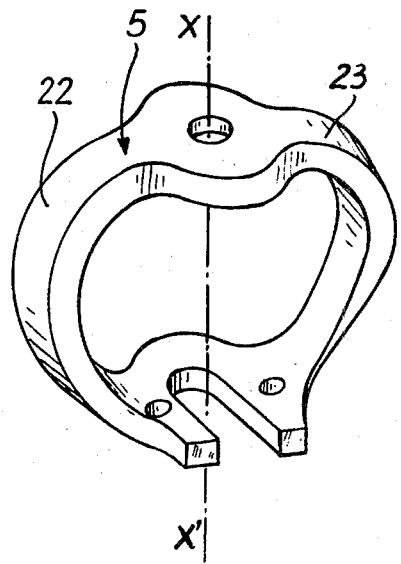
FIG. 5 shows the ring in perspective.

The end of the piston 1 emerging from the cylinder carries a grooved pulley 12, which presses, through a number of steel balls 13, against a thrust-bearing 4 fixed to the inner surface of a metal ring 5, represented in perspective in FIG. 5.

The balls 13 are partly housed in two circular, symmetrical, coaxial grooves 14 and 15, on the sides facing each other of the pulley 12 and thrust-member 4.

The thrust-member, of the thrust ball-bearing type, consists of 2 circular plates 16 and 17, one facing the pulley 12 and containing a groove 15, and the other fixed to the inside surface of the ring 5. These two plates rest on each other by the intermediary of a steel ball 18, which seats in respective spherical cavities provided in each one of plates 16 and 17.

Ring 5 is circular in cross-section and of uniform thickness. The thrust-bearing 4 rests on, and is attached to, the inside surface of the ring by means of a screw 19 centered on the axis XX'. The cylinder body 8 rests on the inside surface of the ring, on a zone centered on the axis XX', diametrically opposite the centre of the zone supporting the thrust-bearing 4. The cylinder body 8 is attached to the ring 5 by screws 20.

Figure 7:
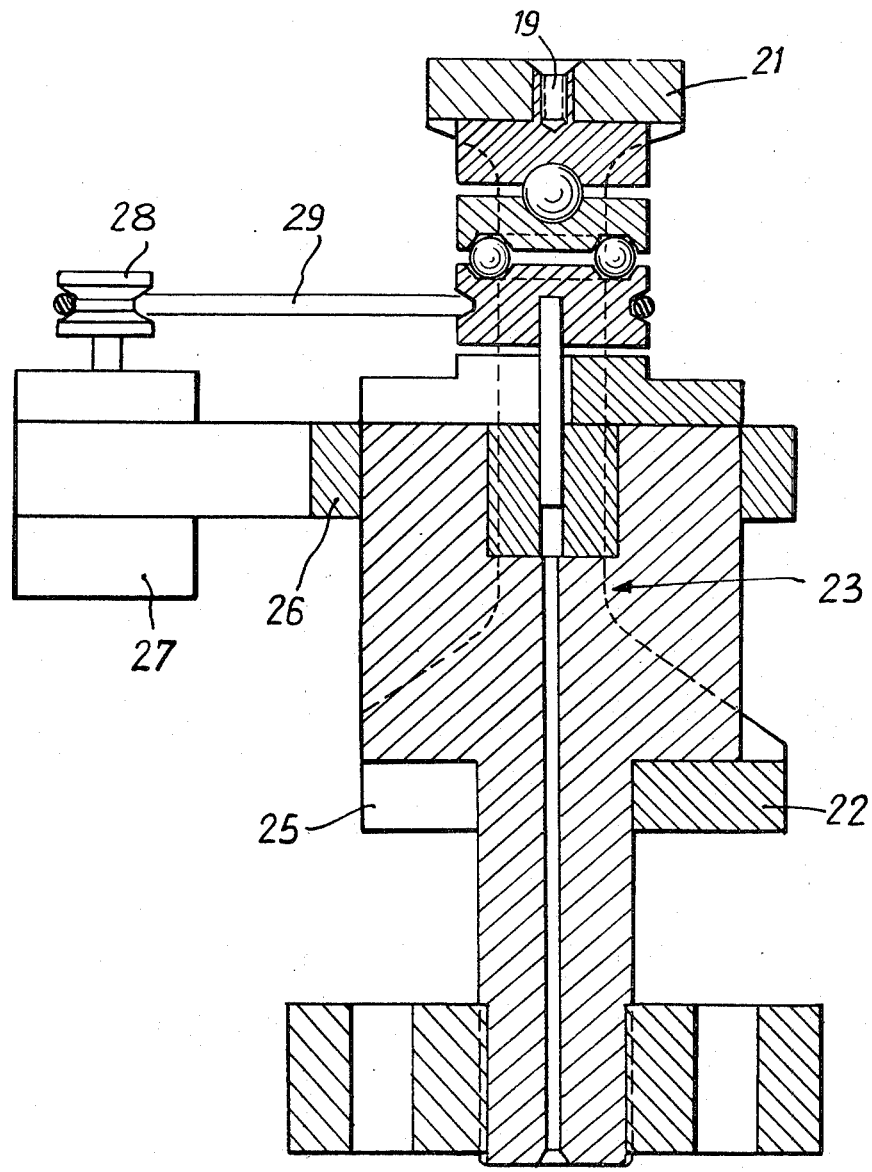
FIG. 7 is a cross-sectional view at right angles to the cross-section in FIG. 6.

In FIG. 7, representing a cross-section perpendicular to the one shown in FIG. 6, the same components are seen. Ring 5 is shown in section, with extensions 21, where the thrust-bearing rests, and 22, where the cylinder barrel rests. The two zones are connected by curves with two symmetrical arcs 23 and 24, along which the width of the ring is uniform.

At diameter apex zone on which the cylinder body rests, the ring 5 contains a notch 25 over only one half of the width of the ring, this notch being slightly wider than the outer diamter of the end fitting, and continuing by a hole, the diameter of which is also slightly greater than the outer diameter of the end-fitting.

A plate 26, carrying a motor 27, is fixed to the cylinder barrel 8, for example by hooping. This motor drives, by means of a pulley 28 and a belt 29, the pulley 12 provided on the end of piston 1 which protrudes from cylinder 2.

FIG. 5 represents ring 5 in perspective, showing the two symmetrical arcs of uniform section 22 and 23, on which the strain gauges 6a and 6b are fixed.

The piston 1 and lining 7 of the cylinder 2 are made from an extremely hard material such as a metal carbide, particularly tungsten carbide. The lining 7 is fitted by heat into the cylinder barrel 8 made of special steel. The stress thereby set up creates an external pressure which counterbalances the force of the inside pressure, ensuring that the cylinder will not be subject to deformation. Tungsten carbide, which is extremely hard, has high compressive strength and at the same time a very low elastic limit, which explains the need for the ferruling process. The piston is subject only to compressive stresses, in an assembly that has eliminated flexional or torsional stresses. The transmitting fluid is a mineral oil which does not gel up to 10,000 bars, and tightness of the piston-cylinder assembly is obtained by careful machining and regrinding, so that they are adjusted to within 1 micron.

To prevent lateral friction and stray strains, possibly arising from gumming-up or viscosity, the measuring piston is kept in rotation by the belt transmission system described above.

Other systems, not described here, may be used to cause the piston to move, e.g. rod and roller transmission systems, which impart an alternating rotary movement to the piston.

The cylinder-piston assembly with connecting passage to the pressure source, which constitutes the pressure detector, is fitted inside a metal ring, the dimensions of which are such that the maximum force applied to two opposing points on its diameter tends to cause it to become oval, by subjecting it to deformation similar to the elastic deformation of a spring. The ring is designed to ensure that its elastic deformation will not exceed 0.13% of the elastic limit of the material used. The high quality of the strain gauges ensures adequate sensitivity.

The dimensions of the ring are determined by consideration of the maximum force to be measured. The ring is easy to fit to, and remove from, the pressure detector, so that the model corresponding to the pressure-range within which measurements are to be taken can be fitted quickly. In one embodiment with a series of four rings, the following successive ranges were covered : 0 – 500 – 1,000 – 5,000 – 10,000 bars.

For the 5,000–10,000 bars ring, deformation at 10,000 bars must not exert stress of more than 0.13% of the elastic limit of the steel, and this is the case with a circular ring with an inside diameter of 102 mm, outside diameter of 122 mm, and uniform width of 12 mm along the two measuring arcs.

It should be noted that when deformation of steel is used as means of detection in a conventional pressure detector, for example when the pressure to be measured is applied inside a curved tube, the steel is subject to stresses that can exceed 20 to 30% of the elastic limit. The response of such appliances does not remain constant over any time period, whereas the measuring appliance according to the instant invention provides a response curve of durable uniformity.

This pressure-measuring appliance can, like other similar appliances, be calibrated using a pressure gauge. However, beyond 5000 bars such gauges are few in number, expensive and difficult to handle, and the appliance can also be calibrated using another force than that generated by pressure, which calibration is much easier to carry out.

Other advantages offered by this appliance, in addition to precision, sensitivity and reliability at high pressure levels, consist of its convenience, lightness, ease of handling and movement from one location to another of an industrial installation.

Safety aspects should also be noted. Since maximum elastic deformation is only 0.13% of the elastic limit of the steel, and overload factor of 10 still ensures acceptable safety limits for the measuring appliance itself. In addition, the use of strain gauges allows measurements to be displayed by any suitable means on the appliance itself, or transmitted by remote measurement.

This means that the appliance can be used to measure pressures on laboratory reactors, and also to check pressures at different points in a petrochemical plant.

The embodiment illustrated in FIGS. 5, 6 and 7 allows pressures of about 5,000 bars to be measured. It can also be used to take measurements in pressure-ranges below 5,000 bars, with suitable rings.

Naturally, to measure pressures in the ranges 0 to 5,000 bars or 500 to 1,000 bars, it is better to use devices which, while based on the same measuring principle, combining the free-piston pressure detector with an indicator of displacement of the piston by measuring the deformation of an elastic ring, make use of cheaper materials and simpler machining techniques.

For example, cylinders can have fitted linings of less expensive materials, and which are easier to use than metal carbides. Cylinders can also be made from rigid materials, such as alloy steels, without fitted lining.

In general, these measuring appliances, regardless of the degree of elaboration in their construction, supply an electric potential variation proportional to the pressure measured, which can be used directly for recording or remote measurements, constituting a considerable practical advantage over other measuring instruments.

It is to be understood that the invention is not limited to the embodiments described and shown, and that various modifications may be made thereto within the scope of the appended claims and without departing from the spirit of the invention.

What is claimed is:

1. An appliance for measuring hydrostatic pressure, said apparatus comprising
   a cylinder defining a bore and a lining fitted into said cylinder for maintaining the inner diameter of said cylinder at a constant value,
   a piston mounted for linear and rotational movement in said cylinder,
   passage means for connecting said cylinder bore to a pressure source so that the pressure of said source is exerted against said piston,
   a component made of a material having a known elasticity,
   said cylinder being positioned to bear against one part of said component, and said piston being positioned to apply against another part of said component at least a portion of the pressure exerted against said piston,
   and means for measuring the strain in said component resulting from the application of said pressure.

2. The appliance of claim 1, in which said lining fitted into said cylinder is made of the same material as said piston.

3. The appliance of claim 1, in which said lining is made of a metal carbide and said piston is made of the same material as said lining.

4. The appliance of claim 1, in which said component is a ring, wherein the common axis of the cylinder and the piston lies along a diameter of the ring with said cylinder attached to said ring at one end of said diameter and said piston bearing against said ring at the other end of said diameter through a thrust bearing.

5. The appliance of claim 4, in which the piston acts on said component through a multiple-ball thrust-bearing and a single-ball joint.

6. An appliance as defined in claim 4, in which the ring is circular in cross-section.

7. An appliance as claimed in claim 1 in which said lining is retained in said cylinder under an external pressure substantially equal to the maximum internal pressure which said appliance is designed to measure.

8. An appliance as claimed in claim 4 in which the dimensions of said ring are such that its deflection does not exceed 0.13% of the elastic limit of the ring, when said ring is subjected to the maximum pressure which the appliance is designed to measure.

9. The appliance of claim 1 which comprises drive means for rotating said piston in said cylinder.

* * * * *